Sept. 19, 1961   E. L. PETERS ET AL   3,000,216
INCREMENTAL HYDROBAROPHONE

Filed Jan. 30, 1959   2 Sheets-Sheet 1

INVENTORS.
EDWARD L. PETERS
MARVIN S. WEINSTEIN
JOHN H. BUEHLER
BY
ATTORNEYS.

INVENTORS.
EDWARD L. PETERS
MARVIN S. WEINSTEIN
JOHN H. BUEHLER

United States Patent Office 3,000,216
Patented Sept. 19, 1961

3,000,216
INCREMENTAL HYDROBAROPHONE
Edward L. Peters, University Park, and Marvin S. Weinstein, Silver Spring, Md., and John H. Buehler, Victoria, Tex., assignors to the United States of America as represented by the Secretary of the Navy
Filed Jan. 30, 1959, Ser. No. 790,304
7 Claims. (Cl. 73—398)
(Granted under Title 35, U.S. Code (1952), sec. 266)

The invention described herein may be manufactured and used by or for the Government of the United States of America for governmental purposes without the payment of any royalties thereon or therefor.

The invention relates to an instrument for detecting small variations in pressure changes due to variations in depths of the sea, where said changes are small and of short duration.

Known instruments of this type generally termed pressure hydrophones respond to tides and swells as well as the disturbances caused by the passing of a ship. Thus it is difficult with these instruments to obtain the measurement of the pressure differences caused by the passage of a ship separately from those pressure differences caused by swells and tidal changes. Also the pressure hydrophones are sensitive to depth and must be calibrated for the depth at which they are to be located. As this calibration is generally done in a laboratory, when the instruments are to be moved from a location having a certain depth to another location having a different depth, it is necessary to return them to the laboratory for calibration to the new depth. An instrument was needed which would automatically compensate for any initial depth of water in which it was placed, and would also ignore changes which were gradual such as tidal changes and pressure differences caused by waves or swells and yet would react to changes of pressure due to water disturbances caused by the passage of a ship over the location of the instrument.

The ambient pressure which one measures in the sea has several components. If one defines pressure signals as signals whose periods are greater than about 0.2 second, three components exist. First, there is the static head equal to the water depth. Secondly, there are very long period waves caused by pressure changes as the result of tidal changes or swells with amplitudes of the order of several feet of water. Finally there are small disturbances with maximum amplitudes of the order of several inches of water. This invention is concerned with the development of an instrument termed a hydrobarophone capable of measuring these small disturbances and of ignoring or compensating for other changes.

The measurement of pressure can be accomplished in a straight forward fashion through the use of a pressure controlled variable inductance. The interior of a housing containing a diaphragm may be at atmospheric pressure. Any change in pressure exterior of the housing causes a deflection of the diaphragm. If a coil is located adjacent the diaphragm and a Permalloy slug carried by the diaphragm is moved in relation to the coil, a change in coil inductance is produced. In normal operation a hydrophone is lowered to the sea bottom and connected to a bridge by underwater electric cables. The bridge is then balanced. Subsequent bridge unbalance is then a measure of pressure changes caused by a difference in the head of water acting on the diaphragm, generally caused by swells or waves, tidal changes and other very small variations. Changes of pressure caused by tidal differences or swells run to several feet of water, which are measured by the instrument. Small variations as might be cause by the passage of a ship over the hydrobarophone, in the nature of tenths of inches, are also measured by the instrument. Such an instrument measures these changes but has limitations. First, the sensitivity is a function of the depth and the operational depth is limited by the pressure which the diaphragm can withstand. It is therefore necessary to know the depth and to calibrate the instrument for that depth. Secondly, for continuous recording of the system output the gain is determined by the tidal amplitude, making accurate measurements of the small variations difficult. Thus for the measurement of the small variations of pressure caused by a change in the head of water of less than one-half inch it would be desirable to develop a hydrobarophone whose sensitivity is independent of depth and which does not respond to those variations of tide or swells.

It is an object of the present invention to provide an instrument termed a hydrobarophone which would compensate for depth and so be capable of use at various depths without calibration for each depth and which would be insensitive to pressure changes of low frequency such as pressure changes caused by the tides or by waves or swells.

It is a further object of the present invention to provide an instrument, termed a hydrobarophone, which includes a deformable bag acted upon by the pressure caused by depth of water to compensate for the variable depths at which the instrument may be located.

It is a still further object of the present invention to provide an electrical measurement of a change of coil inductance caused by moving a Permalloy slug attached to a diaphragm toward or away from the coil.

It is a still further object of the present invention to provide valves, semi-automatic in operation which assist in equalizing the internal and external pressures during the lowering or lifting of the instrument.

Other objects and many of the attendant advantages of this invention will be readily appreciated as the same becomes better understood by reference to the following detailed description when considered in connection with the accompanying drawings wherein.

Figure 1:
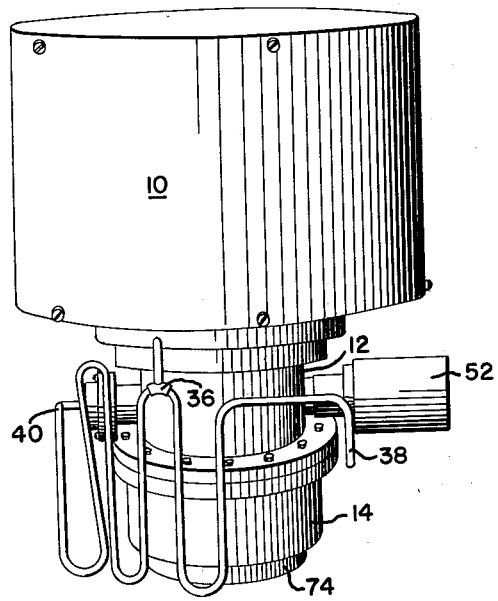
FIG. 1 is a perspective view of the hydrobarophone of the present invention.
Figure 3:
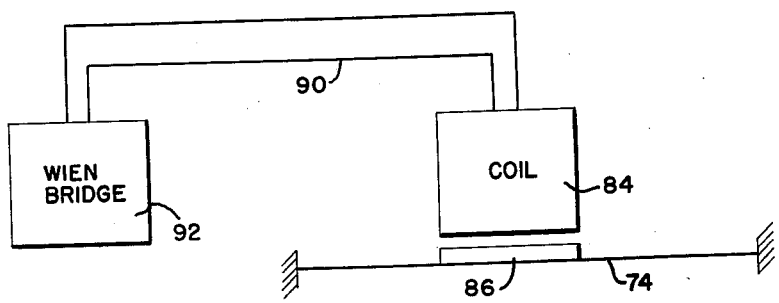
FIG. 3 is a diagrammatic view of a Wien-bridge connected to the coil of FIG. 1.

Referring to the drawings wherein like parts in the several figures are designated by like numerals, the hydrobarophone is shown as composed of three casings, an upper casing or housing 10, a middle casing 12 and a lower casing 14. These three casings are assembled by bolts and gaskets or O-rings so as to have water and air tight connections.

The upper casing 10 is a rigid housing for an inflatable bag 16 and is formed with openings 18 in the bottom plate to permit sea water to enter and contact the bag. The inflatable waterproof bag 16 is loosely carried by the casing 10 and connected with the interior of the middle casing 12 through the short tube 20, cemented at one end to the bag and secured by the plug 22 at the other end to connect with the casing 12.

The middle casing 12 is bolted securely to the upper casing and sealed by O-ring washer 24. A diaphragm 28 is sealed between two rings 25 and 26 by an O-ring 27, said rings being carried between the upper casing and the middle casing. The rings 25, 26 and diaphragm 28 are seated and sealed in the angular recess 30 and sealed by O-ring washers 27 and 32 when rings 25, 26 and diaphragm 28 are screwed to casing 12 by screws 29. An opening 34 in the casing 12 connects the interior of the bag through the tubing connector 36, to the tubes 38 and 40. Tube 38 opens into the chamber 42 which is part of the valve housing 44. The valve housing 44 is secured to the middle or intermediate casing 12 and carries a pop-off valve 46 which is connected to the interior of the middle casing by the passageway 48 and through the tubing 38 to the inflatable bag. The bellows 50 is carried on the valve housing 44 and retained by a perforated screw cap 52. The bellows 50 is held in place by a soluble washer 53 which is carried between the end of the bellows 50 and the screw cap 52. The pop-off valve 46 serves as a pressure valve between the outside sea water pressure and the interior of the middle casing, and is ordinarily closed. During the depositing of the hydrobarophone on the ocean bottom the valve is held open by a rod 54 which is secured to one end 56 of the bellows 50 and moves with that end portion when the bellows expands due to the dissolving of the soluble washer to permit the valve 46 to close.

The tube 40 connects with the cap 60 of the valve housing 58 which is sealingly attached to the middle casing and carries the pop-off valve 62 which works in an opposite direction from valve 46 and is used in retrieving the hydrobarophone from the bottom of the ocean to prevent undue stress on the diaphragm.

The upper compartment 10 is fitted with a plug 64 formed with a central core 66 of boric acid which will dissolve and permit the sea water free access to the diaphragm 28 and also to the opening 34 which will partially fill the tubes 38 and 40 with water at a pressure equal to the depth at which the instrument is located. Soluble washer 53 is designed to dissolve prior to the boric acid core 66 so that valve 46 is closed prior to the entry of sea water into tube 38. Tubes 38 and 40 are bent as shown in FIG. 1 and prevents intimate contact between the sea water and valves 46 and 62.

Securely attached by bolts to the middle casing is the lower casing 14 formed with an electronic equipment compartment 68, an acoustic filter compartment 70 and a coil compartment 72. A diaphragm 74 is bolted to the lower casing 14 and is in open communication with the coil compartment 72 through the passage 82. The lower casing and the middle casing, as well as the lower casing and the diaphragm, are sealed by the O-rings 76.

Carried in the compartment 70 is an acoustic filter 78 connected to the inner casing 12 by the passage 80 and to the coil compartment 72 by the passage 82. This filter consists of a coil of tubing having a small diameter opening and transmits gradual changes in pressure from the middle casing to the coil compartment and to the inside surface of the diaphragm 74, while blocking sudden changes of pressure such as caused by a ship's passage.

A pop-off valve 73 set for a differential pressure of 3 lbs./in.² connects the interior of the casing 12 with the interior of the diaphragm compartment through passage 82 to permit equalization of pressure on each side of diaphragm during the lowering of the hydrobarophone into deep water.

Electronic equipment, the function of which will be omitted from this application is carried in the compartment 68.

A coil 84, connected directly to a Wien bridge 83 is mounted in the compartment 72 in close proximity to a Permalloy slug 86 carried by the diaphragm 74. The movement of the Permalloy slug 86 relative to the coil 84 by reason of a movement of the diaphragm caused by a pressure differential between the outside sea water pressure and that of the compartment 72 produces a variation in inductance which is measured by means of the Wien bridge.

In the middle casing a bellows 88 oil filled, and capped with the flexible diaphragm 28, serves to transmit the pressure exerted on the diaphragm 28, by the air pressure in bag 16 or later by direct contact with the sea water entering through the holes 18 of the upper casing into the upper casing and then through the hole in the plug 64, left by the dissolving of the core 66, into contact with the diaphragm 28, to the interior of the middle casing 12 and through the acoustic filter to the compartment 72 and the interior face of the diaphragm 74.

Figure 2:
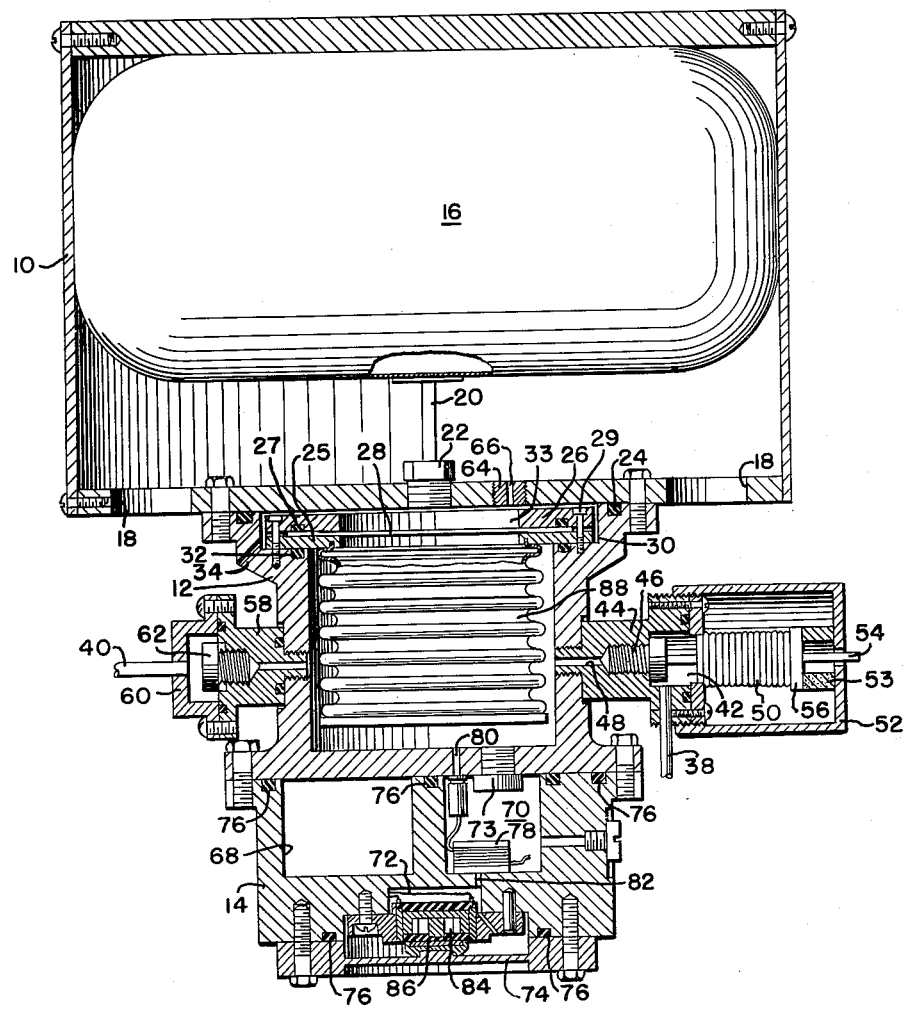
FIG. 2 is a somewhat enlarged vertical section of the instrument shown in FIG. 1.

The hydrobarophone is put into operation by inflating the bag 16 to atmospheric pressure at which the bag assumes the position shown in FIG. 2, not completely filling the casing 10 but restricted by the sides thereof. The plug 64 with the soluble core 66 and the soluble washer 53 are in position, the first closing the space 33 to the water, and the second holding the pop-off valve 46 open to the air pressure of the tube 38 which is connected to the interior of the bag 16 through the opening 34, space 33 and connecting tube 20. Electric cable 90 connects the coil with a Wien bridge 92 and the instrument is lowered to the bottom of the sea at a depth limited by the air carried by the inflatable bag.

With the entrance into the water the upper casing is flooded through the openings 18 and the bag 16 compressed in accordance with the static head of water at any instant. This air pressure within the bag is transmitted through the tube 20, the space 33, opening 34, tube connector 36 and tubes 38 and 40 to the valve housings 44 and 58 respectively. The pressure in tube 40 has no effect as the pop-off valve 62 opens outward. The pressure in tube 38 is transmitted thru the initially open pop-off valve 46, which is held open by the bellows operated rod 54, to the interior of the middle casing, through the acoustic filter to the coil compartment 72 where it acts on the inside face of the diaphragm 74 to balance the pressure of the static head of water acting on the exterior face of the diaphragm 74. Thus the continuing changing pressure of the head of water, as the instrument is being lowered, is transmitted to the bag, and thence from the bag through the bellows compartment to the coil compartment to balance the hydrostatic pressure on the exterior face of the diaphragm 74.

At some predetermined period after the instrument reaches the sea bottom the soluble washer 53 and the boric acid core 66 will dissolve. With the disappearance of washer 53 the bellows 50 expands and the rod 54 is withdrawn from the pop-off valve 46, closing the passageway 48 so that the middle casing is shut off from the interior of the bag 16 and any pressure in the casing 12 is transmitted to the bellows 88 and through the acoustic filter to the coil compartment 72 and the interior face of the diaphragm 74. Where the lowering is such that there is a pressure differential of at least 3 lbs./in.² the pop-off valve 73 will function to by-pass the filter and equalize the pressure on the inward side of the diaphragm. The dissolving of the core 66 permits the entrance of sea water from the upper casing into the space 33 and through the hole 34, the tubes 38 and 40 to the valve housings 44 and 58 where it is stopped by the valves 46 and 62 respectively. The pressure of the water acting on the diaphragm 28 is transmitted through the bellows 88 to the interior of the middle casing, through the acoustic filter to the coil compartment and the interior face of the diaphragm 74.

When changes in the head of water occur that are gradual such as swells or tidal changes the pressures on both the interior face and the exterior face of the diaphragm 74 are the same and there is no movement of the diaphragm. However when the changes in head are of short duration the acoustic filter serves as a barrier and there is a difference of pressures on the interior and exterior faces of the diaphragm 74 causing a deflection of the diaphragm, moving the Permalloy slug relative to the coil to vary the inductance which is measured on the Wien bridge. The variation of inductance may be amplified and used as signals or energizers.

When the hydrobarophone is raised a considerable difference in pressure may be obtained on opposite sides of the diaphragm 74. This pressure is bled through the pop-off valve 62 to prevent strain on the diaphragm 74. When the instrument is on the floor of the ocean there is a difference in the static head exerted on the bellows 88 and the exterior face of the diaphragm 74. This difference is a constant of the depth of the water and is compensated for by balancing the Wien bridge.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A Wien bridge type hydrobarophone for use in the depths of the sea, comprising an upper casing, a middle casing, and a lower casing connected together in sealing relation, an inflated flexible bag in said upper casing exposed exteriorly to sea water, a bellows carried in said middle casing, the interior of said bellows being sealed off from the interior of said middle casing, a rubber diaphragm across one end of said bellows, sealed passage means open to the inside of said bag and the side of said rubber diaphragm outside the chamber formed by said rubber diaphragm and said bellows, a coil carried in said lower casing, a metal diaphragm sealing said lower casing and exposed on its exterior face to the sea, its interior face being in proximity to said coil, means filtering gradual changes of pressure and serving to block sudden changes of pressure from the interior of the middle casing to the interior face of the metal diaphragm to equalize the pressures on the faces of the metal diaphragm, a Permalloy slug carried by and movable with the metal diaphragm under the influence of any pressure differentials on the exterior and interior faces of said metal diaphragm to vary the inductance of the coil and means for measuring this inductance variation.

2. A hydrobarophone according to claim 1 wherein the pressure filtering means consists of a long tube having a small diameter opening.

3. A hydrobarophone according to claim 1 including means to temporarily connect the bag to the middle casing, wherein the inflatable bag functions only during the lowering of the hydrobarophone.

4. A Wien bridge type hydrobarophone for use in the depths of the sea, comprising an upper casing, a middle casing and a lower casing connected together in sealing relation, an inflated flexible bag in said upper casing and exposed exteriorly to sea water, a bellows carried in the middle casing, the interior of said bellows being sealed off from the interior of said middle casing, a rubber diaphragm across one end of said bellows, sealed passage means open to the inside of said bag and the side of said rubber diaphragm outside the chamber formed by said rubber diaphragm and said bellows, means bypassing the bellows and transferring the interior pressure of the bag directly to the interior of the middle chamber during the lowering of the hydrobarophone to the bottom of the sea, a coil carried in said lower casing, means for energizing said coil, a metal diaphragm sealing said lower casing and exposed on its exterior face to the sea, its interior face being in proximity to said coil, means filtering gradual changes of pressure and serving to block sudden changes of pressure from the interior of the middle casing to the interior face of the metal diaphragm to equalize the pressures on the faces of the metal diaphragm, a Permalloy slug carried on the interior face of the metal diaphragm and movable, under any pressure differential on the faces of the metal diaphragm, toward and away from the coil to vary the inductance of the coil, and means for measuring this variation.

5. A hydrobarophone according to claim 4 where the induction variation measuring means is a Wien bridge.

6. A hydrobarophone according to claim 4 wherein the bypassing means comprises a valve between the bag and the interior of the middle casing and means for holding said valve open for a limited period.

7. A hydrobarophone according to claim 6 wherein the means for holding the valve open comprises a bellows, a rod carried by and movable with said bellows and engaging said valve and a washer soluble in sea water normally holding the bellows in position to retain the valve in open position.

References Cited in the file of this patent

UNITED STATES PATENTS

| | | |
|---|---|---|
| 1,935,736 | Colvin et al. | Nov. 21, 1933 |
| 2,490,595 | Merten | Dec. 6, 1949 |
| 2,715,680 | Tatel et al. | Aug. 16, 1955 |